(No Model.)
W. V. WHIPPLE.
HAT AND BONNET STAND.
No. 288,287. Patented Nov. 13, 1883.
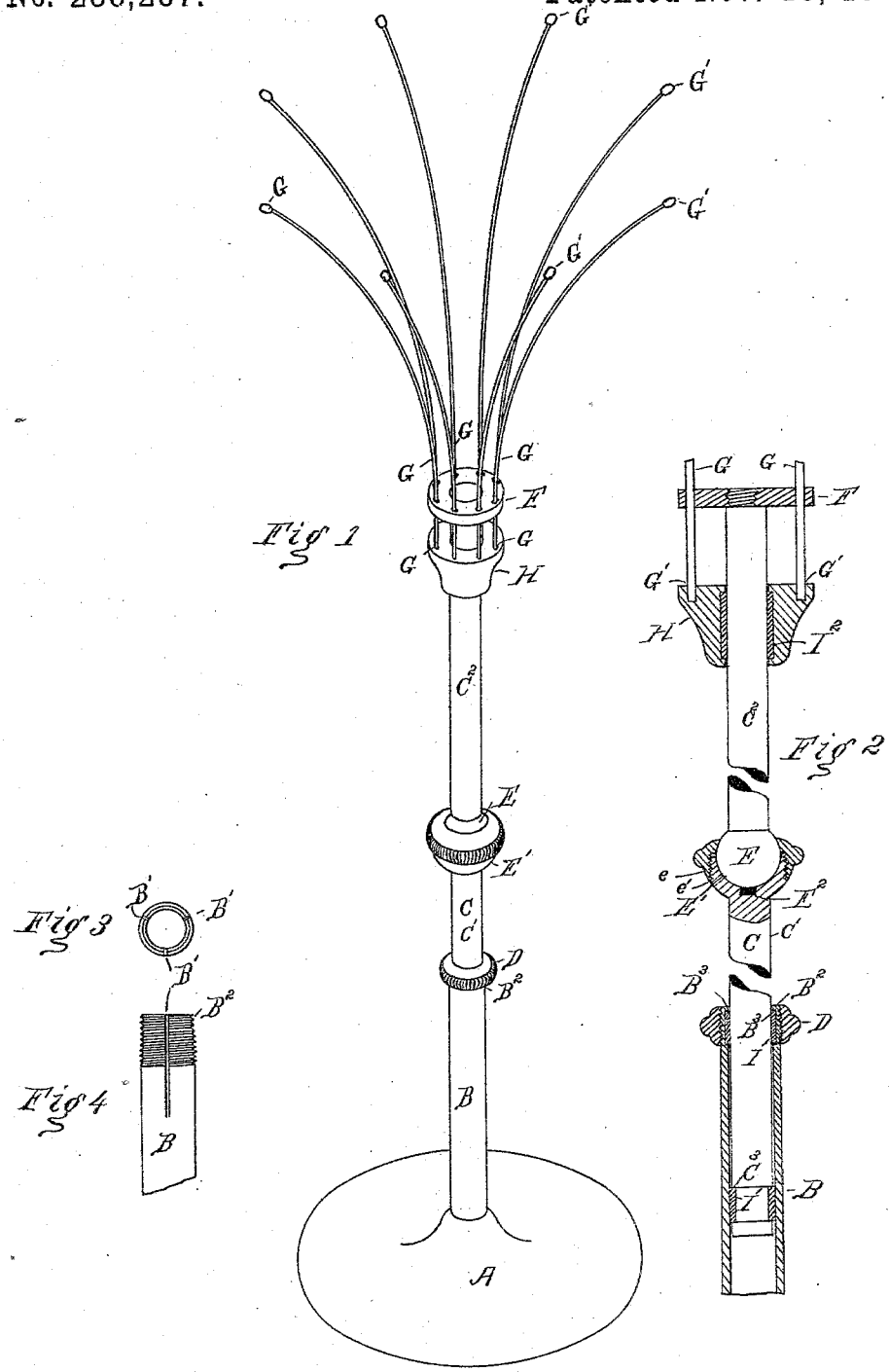
Witnesses
Edward W. Thompson
Irving S. Porter
Inventor
William V. Whipple,
By Albert M. Moore,
His Attorney.

UNITED STATES PATENT OFFICE.

WILLIAM V. WHIPPLE, OF BOSTON, MASSACHUSETTS.

HAT AND BONNET STAND.

SPECIFICATION forming part of Letters Patent No. 288,287, dated November 13, 1883.

Application filed February 19, 1883. (No model.)

*To all whom it may concern:*

Be it known that I, WILLIAM V. WHIPPLE, a citizen of the United States, residing in Boston, in the county of Suffolk and Commonwealth of Massachusetts, have invented certain new and useful Improvements in Hat and Bonnet Stands, of which the following is a specification.

My invention relates to means for holding the hat or bonnet on the stand, means for turning the upper part of the stand at such an angle as properly to display and exhibit such hat or bonnet without handling the same, means for elevating the top of the stand and holding it in place, and means for avoiding marring the sliding standard and other sliding surfaces.

In the accompanying drawings, Figure 1 is an elevation of such a stand with the wires spread apart; Fig. 2, a vertical central section of the same without the foot, the parts being enlarged and the upper parts of the wires being broken off; Fig. 3, a horizontal cross-section of the split upper part of the hollow stem; Fig. 4, an elevation of said upper portion of said stem.

A is a circular foot, preferably of metal heavy enough to prevent the stand from being too easily toppled over.

B is the outer hollow stem, securely fastened to said foot. Within the stem slides the rod C. The stem B is provided at the top with one or more vertical slits, B', and a conical screw, $B^2$, on which a nut, D, is turned, to pinch the rod C and hold it at any desired height. In order that the rod C may not be marred by direct contact with the stem B, said stem has an internal annular recess, $B^3$, in which is a washer, I, of leather or other soft material, and the rod C, in an outer annular groove, $C^3$, near its lower end, has another washer, I', of similar material. These washers I I' prevent the rod C and stem B from touching each other. The rod C is made in two lengths, C' $C^2$, connected by a ball-and-socket joint, E E', which allows the upper length, $C^2$, to be inclined to the lower, C'; and in the socket E' is a depression holding a piece of rubber, $E^2$, which, by its friction on the ball, holds the upper length, $C^2$, at any desired inclination when the upper part of the socket E' is screwed down upon the lower, the socket being made in halves joined by the screws e e' for that purpose.

On the top of the upper length, $C^2$, of the rod C is a circular plate, F, centrally secured to said length $C^2$ at right angles to the same, said plate being provided near its edge with holes, through which the wires G project. The lower ends of the wires G are firmly secured in the slide H, which surrounds the upper part of said rod C. The wires have a permanent outward curve, as shown, and the slide has, in an annular chamber, a washer, $I^2$, of rubber, leather, or similar material, which presses with friction upon the rod C, and (being aided by the elasticity and curvature of the wires G) holds the slide at any desired point on the upper length of the rod C. The wires G are provided at their free ends with rubber tips G', to prevent the ends of the wires from wearing the goods suspended on them, and by enlarging the ends of the wires to keep them from sticking through braided goods between the braids.

Hats, bonnets, or other similar goods are placed over the wires, before the upper ends of the latter are spread apart, by pushing the slide H up toward the plate F. The spreading apart of the wires holds the goods on the stand, and the goods can then be held or turned at any angle by the means above described. The parts above described (except those specified to be of other material) are preferably of metal, and may be nickel-plated.

This invention obviates the necessity of frequently handling costly goods of the classes named, such as might be readily spoiled by soiling and pressing.

I claim as my invention—

1. The combination of the hollow stem B, provided with one or more vertical slits, B', and a conical screw-threaded top, $B^2$, the nut D, and the rod C, the plate F, provided with holes, the slide H, and the wires G, as and for the purpose specified.

2. The combination of the rod C, the plate F, provided with holes, the slide H, and the wires G, having a permanent curvature, as and for the purpose specified.

3. The combination of the hollow stem B, provided with a recess, B³, and the washer I, and rod C, as and for the purpose specified.

4. The combination of the hollow stem B, provided with a recess, B³, the washer I, the rod C, provided with an annular groove, C³, and the washer I', as and for the purpose specified.

5. The socket E', formed in halves, provided with screws $e\ e'$, the lower half of said socket having a depression, and the rubber E², in combination with the ball E, as and for the purpose specified.

WILLIAM V. WHIPPLE.

Witnesses:
ALBERT M. MOORE,
E. L. GROSVENOR.